United States Patent
Huang

(10) Patent No.: US 12,067,650 B2
(45) Date of Patent: Aug. 20, 2024

(54) IMAGING APPARATUS AND IMAGING METHOD

(71) Applicant: NEC Corporation, Tokyo (JP)

(72) Inventor: Chenhui Huang, Tokyo (JP)

(73) Assignee: NEC CORPORATION, Tokyo (JP)

(*) Notice: Subject to any disclaimer, the term of this patent is extended or adjusted under 35 U.S.C. 154(b) by 966 days.

(21) Appl. No.: 16/980,190

(22) PCT Filed: Mar. 19, 2019

(86) PCT No.: PCT/JP2019/011558
§ 371 (c)(1),
(2) Date: Sep. 11, 2020

(87) PCT Pub. No.: WO2019/181969
PCT Pub. Date: Sep. 26, 2019

(65) Prior Publication Data
US 2021/0019923 A1    Jan. 21, 2021

(30) Foreign Application Priority Data
Mar. 20, 2018  (JP) ................................ 2018-052222

(51) Int. Cl.
*G06T 11/00* (2006.01)
*H04N 5/33* (2023.01)
*H04N 23/55* (2023.01)

(52) U.S. Cl.
CPC ........... *G06T 11/003* (2013.01); *H04N 23/55* (2023.01); *H04N 5/33* (2013.01)

(58) Field of Classification Search
None
See application file for complete search history.

(56) References Cited

U.S. PATENT DOCUMENTS

| | | | | |
|---|---|---|---|---|
| 2010/0110070 A1* | 5/2010 | Kim | ...................... | H04N 13/128 345/419 |
| 2013/0182930 A1* | 7/2013 | Trzasko | ................ | G06T 11/006 382/131 |

(Continued)

FOREIGN PATENT DOCUMENTS

| JP | 2011-166255 A | 8/2011 |
|---|---|---|
| JP | 2017-015694 A | 1/2017 |

(Continued)

OTHER PUBLICATIONS

International Search Report for PCT Application No. PCT/JP2019/011558, mailed on May 28, 2019.

(Continued)

*Primary Examiner* — Santiago Garcia
(74) *Attorney, Agent, or Firm* — Sughrue Mion, PLLC

(57) ABSTRACT

An imaging apparatus according to an aspect of the present disclosure includes: a filter that includes a region through which a two-dimensional signal indicating an image passes, and includes a portion which blocks at least a part of the two-dimensional signal in the region; a detector that detects a power of the two-dimensional signal passing through the filter; at least one memory storing a set of instructions; and at least one processor configured to execute the set of instructions to reconstruct the image indicated by the two-dimensional signal based on the power detected in a plurality of conditions that differ in positional relationship between the two-dimensional signal imaged on the filter and a distribution of the portion.

8 Claims, 12 Drawing Sheets

(56) References Cited

U.S. PATENT DOCUMENTS

| | | | | |
|---|---|---|---|---|
| 2013/0259343 | A1* | 10/2013 | Liu | G06T 11/003 |
| | | | | 382/131 |
| 2013/0279785 | A1* | 10/2013 | Proksa | G06T 11/006 |
| | | | | 382/131 |
| 2015/0116563 | A1 | 4/2015 | Herman et al. | |
| 2015/0332498 | A1* | 11/2015 | Zhang | G06T 11/003 |
| | | | | 345/420 |
| 2016/0116410 | A1* | 4/2016 | Blasinski | G01N 21/55 |
| | | | | 702/189 |
| 2016/0143607 | A1* | 5/2016 | Cao | A61B 6/027 |
| | | | | 378/20 |
| 2017/0016768 | A1* | 1/2017 | Golub | G06T 11/60 |
| 2017/0070709 | A1* | 3/2017 | Sato | H04N 23/66 |
| 2017/0209111 | A1* | 7/2017 | Choi | A61B 6/032 |
| 2017/0345132 | A1* | 11/2017 | Schlüter | G06T 11/003 |
| 2018/0246030 | A1 | 8/2018 | Ota et al. | |
| 2019/0050372 | A1* | 2/2019 | Zeng | G06F 17/16 |
| 2019/0137758 | A1* | 5/2019 | Banks | H04N 13/344 |

FOREIGN PATENT DOCUMENTS

| | | |
|---|---|---|
| JP | 2017-055386 A | 3/2017 |
| JP | 2017-507585 A | 3/2017 |
| WO | 2016/136801 A1 | 9/2016 |

OTHER PUBLICATIONS

English translation of Written opinion for PCT Application No. PCT/JP2019/011558, mailed on May 28, 2019.

S. Boyd, N. Parikh, E. Chu et al, Distributed Optimization and Statistical Learning via the Alternating Direction Method of Multipliers, Foundation and Trends in Machine Learning vol. 3, No. 1 1-122, 2010., USA.

Japanese Office Action for JP Application No. 2020-507849 mailed on Oct. 19, 2021 with English Translation.

* cited by examiner

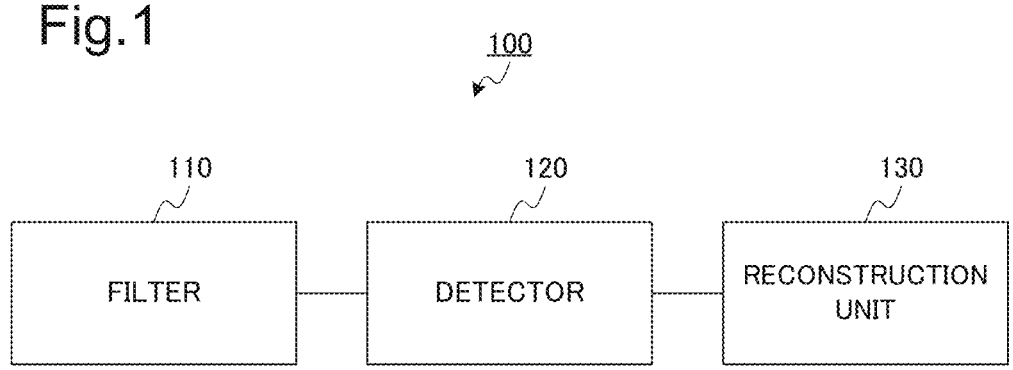
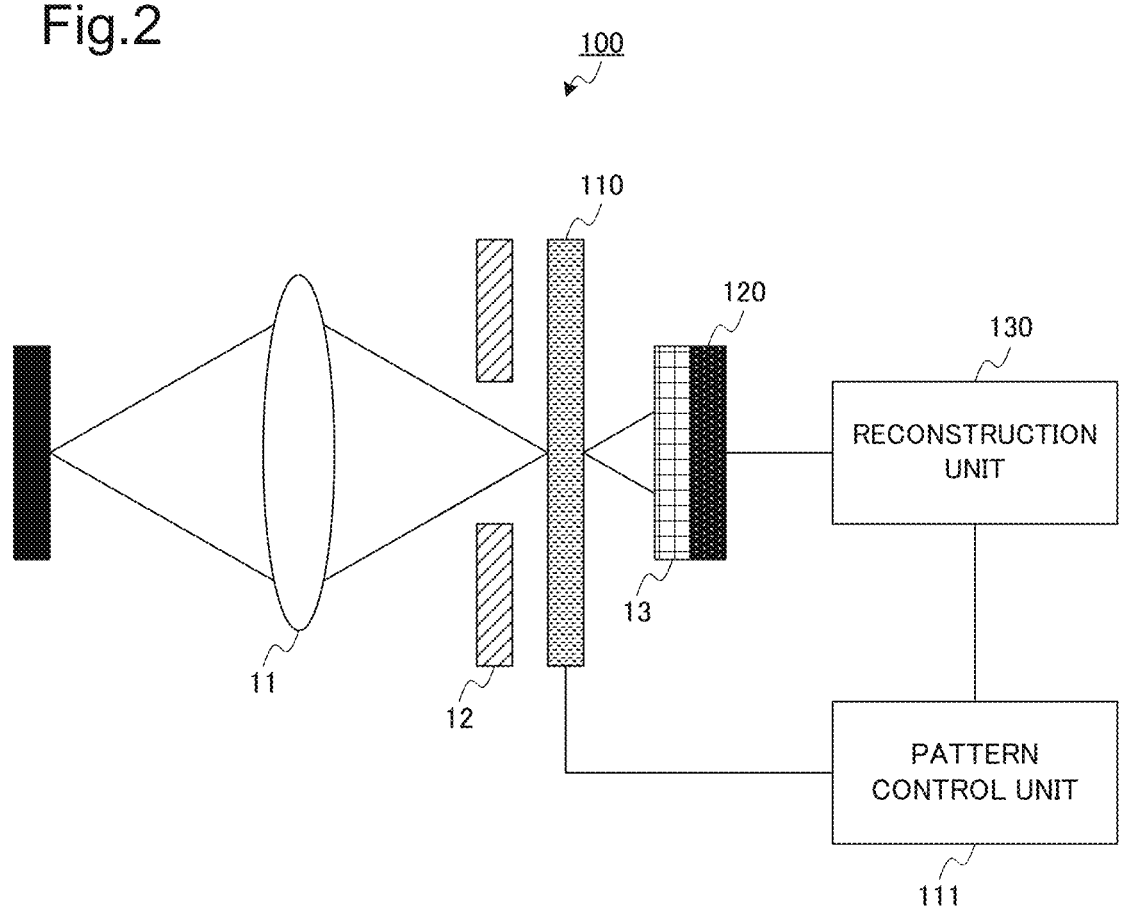

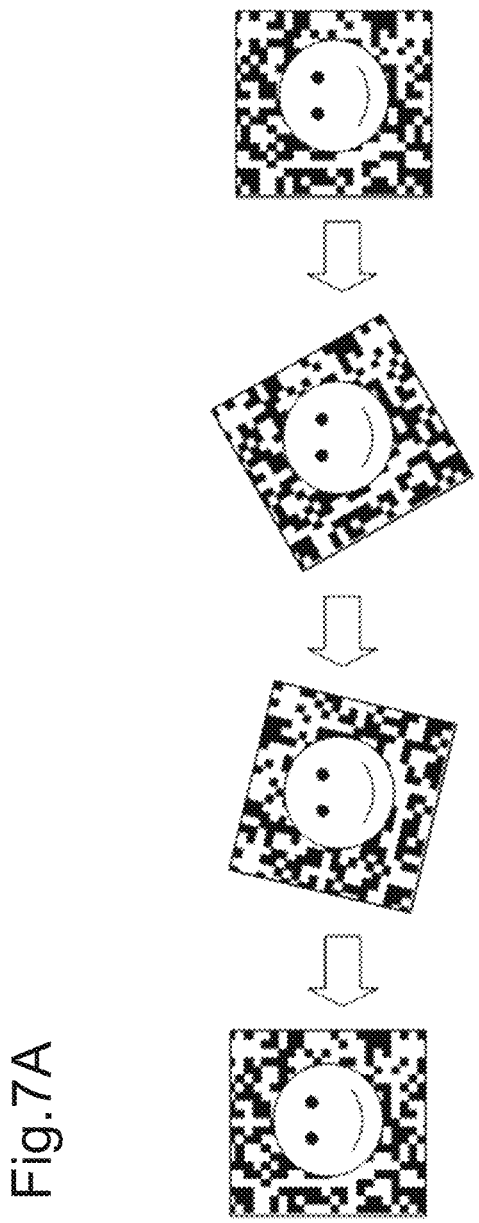

IMAGING APPARATUS AND IMAGING METHOD

This application is a National Stage Entry of PCT/JP2019/011558 filed on Mar. 19, 2019, which claims priority from Japanese Patent Application 2018-052222 filed on Mar. 20, 2018, the contents of all of which are incorporated herein by reference, in their entirety.

TECHNICAL FIELD

The present disclosure relates to an imaging apparatus and an imaging method.

BACKGROUND ART

A technology called compression sensing that restores a target such as an image from observation data less than needed data has been developed. In the compression sensing, as an algorithm for restoring the target, an algorithm such as an alternating direction method of multipliers (ADMM) algorithm described in NPL 1 is used.

CITATION LIST

Non Patent Literature

[NPL 1] S. Boyd, N. Parikh, E. Chu et al, Distributed Optimization and Statistical Learning via the Alternating Direction Method of Multipliers, Foundation and Trends in Machine Learning 3, 1-122, 2010.

SUMMARY OF INVENTION

Technical Problem

Generally, it is preferable to capture an image or the like at a high speed. Therefore, it is desired to accelerate imaging processing including acquisition of observation data and construction of an image from the acquired observation data even in a case where the compression sensing technology is used.

To solve the above problems, a main object of the present disclosure is to provide an imaging apparatus or the like that can increase a speed of imaging processing.

Solution to Problem

An imaging apparatus according to one aspect of the present disclosure includes: a filter that includes a region through which a two-dimensional signal indicating an image passes, and includes a portion which blocks at least a part of the two-dimensional signal in the region through which the two-dimensional signal passes; a detector that detects a power of the two-dimensional signal passing through the filter; and reconstruction means for reconstructing the image indicated by the two-dimensional signal based on the power detected in a plurality of conditions that differ in positional relationship between a two-dimensional signal imaged on the filter and a distribution of the portion that blocks at least a part of the two-dimensional signal.

Furthermore, an imaging method according to one aspect of the present disclosure includes: detecting a power of a two-dimensional signal passing through a filter that includes a region through which the two-dimensional signal indicating an image passes, and includes a portion which blocks at least a part of the two-dimensional signal in the region through which the two-dimensional signal passes; and reconstructing the image indicated by the two-dimensional signal based on the power detected in a plurality of conditions that differ in positional relationships between the two-dimensional signal that imaged on the filter and a distribution of the portion that blocks at least a part of the two-dimensional signal.

Advantageous Effects of Invention

According to the present disclosure, it is possible to provide an imaging apparatus or the like that can increase a speed of imaging processing.

BRIEF DESCRIPTION OF DRAWINGS

FIG. 1 is a diagram illustrating an imaging apparatus according to an example embodiment.

FIG. 2 is a diagram illustrating an example of a detailed configuration of the imaging apparatus according to the example embodiment.

FIG. 7A is a diagram illustrating an example of a case where the positional relationship between the two-dimensional signal and the pattern of the filter changes.

EXAMPLE EMBODIMENT

Figure 3:
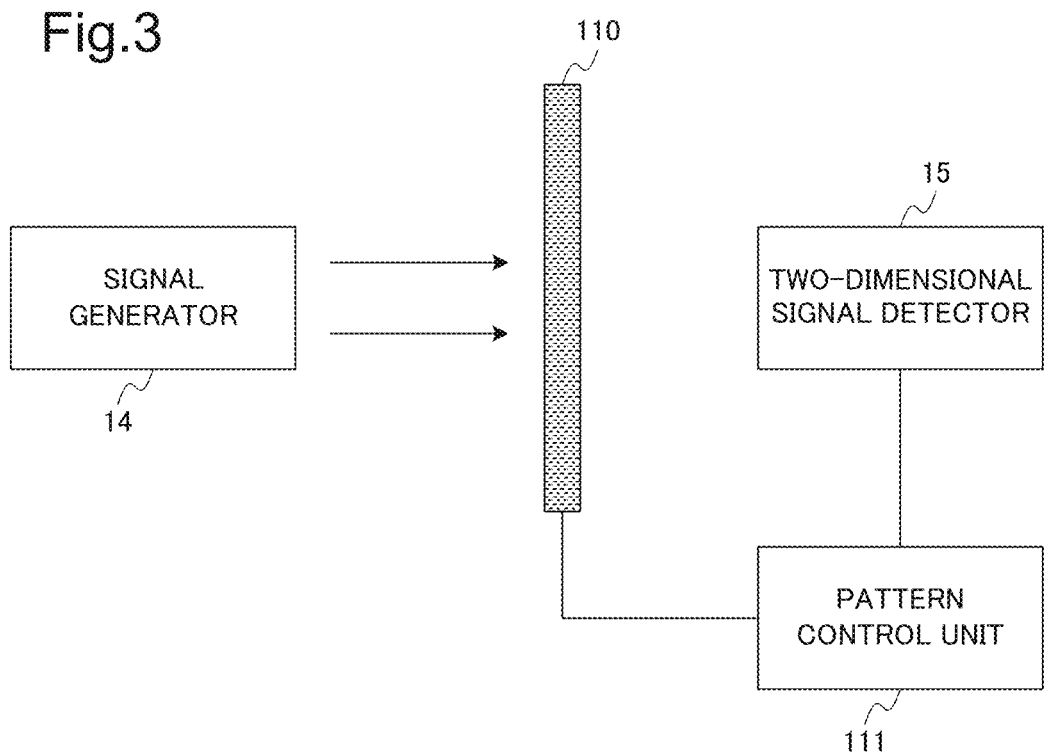
FIG. 3 is a diagram illustrating an example of a configuration in a case where a transformation matrix used by the imaging apparatus according to the example embodiment is obtained.

An example embodiment of the present disclosure will be described with reference to the drawings. FIG. 1 is a diagram illustrating an imaging apparatus according to an example embodiment.

As illustrated in FIG. 1, an imaging apparatus 100 according to the example embodiment includes a filter 110, a detector 120, and a reconstruction unit 130. The filter 110 includes a region through which a two-dimensional signal indicating an image passes, and a portion that blocks at least a part of the two-dimensional signal is provided in the region through which the two-dimensional signal passes. The detector 120 detects a power of the two-dimensional signal that has passed through the filter 110. The reconstruction unit 130 reconstructs the image indicated by the two-dimensional signal on the basis of the power of the plurality of two-dimensional signals detected in cases of different positional relationships between the two-dimensional signal and the distribution of the portion of the filter 110 that blocks at least a part of the two-dimensional signal.

In the following example embodiment, the two-dimensional signal is, for example, an image of light such as a visible light beam imaged by a lens. That is, the two-dimensional signal is a signal that is converged by an element, such as a lens, that converges a signal and indicates an image on an entire or a part of an image forming surface.

The imaging apparatus 100 includes a configuration illustrated in FIG. 2 as a more specific example. In the configuration illustrated in FIG. 2, the imaging apparatus 100 further includes a pattern control unit 111, a lens 11, an iris 12, and a scattering medium 13 in addition to the components described above. In the configuration illustrated in FIG. 2, it is assumed that the two-dimensional signal be, for example, a visible light beam.

An image to be reconstructed by the imaging apparatus 100 is obtained by the lens 11. An image obtained by the lens is formed by the filter 110. That is, the filter 110 is normally disposed at a position where the image obtained by the lens 11 is formed. The iris 12 and the scattering medium 13 are provided to reconstruct the image with higher accuracy, as needed. The iris 12 blocks miscellaneous signals. The scattering medium 13 homogenizes a signal that has passed through the filter 110.

The pattern control unit 111 controls the filter 110 in such a way as to change a positional relationship between the two-dimensional signal and a distribution of a portion of the filter 110 that blocks at least a part of the two-dimensional signal. Hereinafter, in the present example embodiment, there is a case where the distribution of the portion of the filter 110 that blocks at least a part of the two-dimensional signal is referred to as a pattern of the filter 110 or simply referred to as a pattern.

The imaging apparatus 100 reconstructs the image using the compression sensing technology described above. More specifically, on the basis of a power of a signal that has passed through the pattern of the filter 110 and detected by the detector 120, an image indicated by the signal is reconstructed. The number of powers detected by the detector 120 is less than the number of pixels in the image to be reconstructed.

The image is reconstructed using a transformation matrix D obtained according to the pattern of the filter 110 on the basis of an ADMM algorithm which is one of compression sensing technologies. Hereinafter, a procedure for obtaining the transformation matrix D and a procedure for reconstructing the image on the basis of the ADMM algorithm using the transformation matrix D will be described.

In the following description of the procedure for determining the transformation matrix and the procedure for reconstructing the image, it is assumed that the two-dimensional signal be a visible light beam. It is assumed that the image to be reconstructed be a general visible light beam image. However, as described later, the two-dimensional signal is not limited to the visible light beam and may be a signal such as an electromagnetic wave or a sound wave including an ultrasonic wave other than the visible light beam.

First, a procedure for obtaining the transformation matrix D will be described. The transformation matrix D is obtained using the configuration illustrated in FIG. 3, for example. The number of rows and the number of columns of the transformation matrix D are determined in accordance with the number of pixels in the image to be reconstructed. Hereinafter, it is assumed that the image to be reconstructed be x, a width of the image x include m pixels, and a length of the image x include n pixels. Hereinafter, there is a case where the procedure for obtaining the transformation matrix D is referred to as a calibration process or simply referred to as calibration.

In the example illustrated in FIG. 3, a signal generated from a signal generator 14 passes through the filter 110. Then, the light that has passed through the filter 110 is detected by a two-dimensional signal detector 15. A surface of the filter 110 facing the signal generator 14 or the two-dimensional signal detector 15 has a region through which the two-dimensional signal passes. Then, in this region of the filter 110, the portion that blocks at least a part of the two-dimensional signal is provided. As a portion of the filter 110 that blocks at least a part of the two-dimensional signal, a semi-transmission portion that blocks a part of the two-dimensional signal and through which a part of the two-dimensional signal passes, and a non-transmission portion through which the two-dimensional signal does not pass and is blocked are included. A portion other than the portion that blocks at least a part of the two-dimensional signal is assumed as a portion through which the two-dimensional signal passes as it is. Details of these will be described later.

In the example illustrated in FIG. 3, the region of the filter 110 through which the two-dimensional signal passes is preferably disposed to face toward a direction perpendicular to a traveling direction of the signal generated from the signal generator 14.

The signal generator 14 generates a two-dimensional signal according to the signal detected by the detector 120. The signal generator 14 preferably generates a signal having a wavelength close to a wavelength of the two-dimensional signal detected by the detector 120. For example, in a case where the two-dimensional signal is a visible light beam, the signal generator 14 generates visible light.

If it is possible to generate a desired signal according to a wavelength of the visible light, the electromagnetic wave, or the like detected by the detector 120, a specific configuration or the like of the signal generator 14 is not particularly limited. However, it is preferable that the signal generator 14 can uniformly irradiate the pattern of the filter 110, that is, a difference between the powers of the signals applied to the respective regions of the pattern be as small as possible.

The two-dimensional signal detector 15 measures a power of the signal that is generated from the signal generator 14 and that has passed through the filter 110. The two-dimensional signal detector 15 detects a power for each position of the signal unlike the detector 120 which will be described below in detail. Therefore, as the two-dimensional signal detector 15, a sensor having the number of pixels equal to or more than the number of pixels in the image to be reconstructed by the imaging apparatus 100 is used. Sensitivity characteristics of the two-dimensional signal detector 15 are preferably close to sensitivity characteristics of the detector 120.

In a case where the signal is a visible light beam, as the two-dimensional signal detector 15, a camera of a general Charge Coupled Device (CCD) or Complementary metal-oxide-semiconductor (CMOS) image sensor, or the like is used. As the two-dimensional signal detector 15, for example, when the signal is ultraviolet rays, an ultraviolet ray camera is used. When the signal is near infrared rays, an Indium Gallium Arsenide (InGaAs) camera is used. When the signal is mid-far infrared rays, a thermal image camera is used. The arrangement of the pixels including the number of pixels and an aspect ratio of the two-dimensional signal detector 15 is determined depending on the number of pixels in the image to be reconstructed and the arrangement of the pixels.

The power of the signal that has been generated from the signal generator 14 and has passed through the filter 110 changes for each pixel according to the positional relationship between the pixel of the two-dimensional signal detector 15 and the pattern of the filter 110. That is, the two-dimensional signal detector 15 detects the power of the signal from the signal generator 14 that changes for each pixel according the positional relationship between the pixel of the two-dimensional signal detector 15 and the pattern of the filter 110.

The power of the signal detected by the two-dimensional signal detector 15 changes according to the change in the pattern of the filter 110 or the change in the positional relationship between the pattern of the filter 110 and the pixel of the two-dimensional signal detector 15 due to rotation or the like of the filter 110. The transformation matrix D is obtained on the basis of the plurality of powers obtained as described above.

Figure 4:
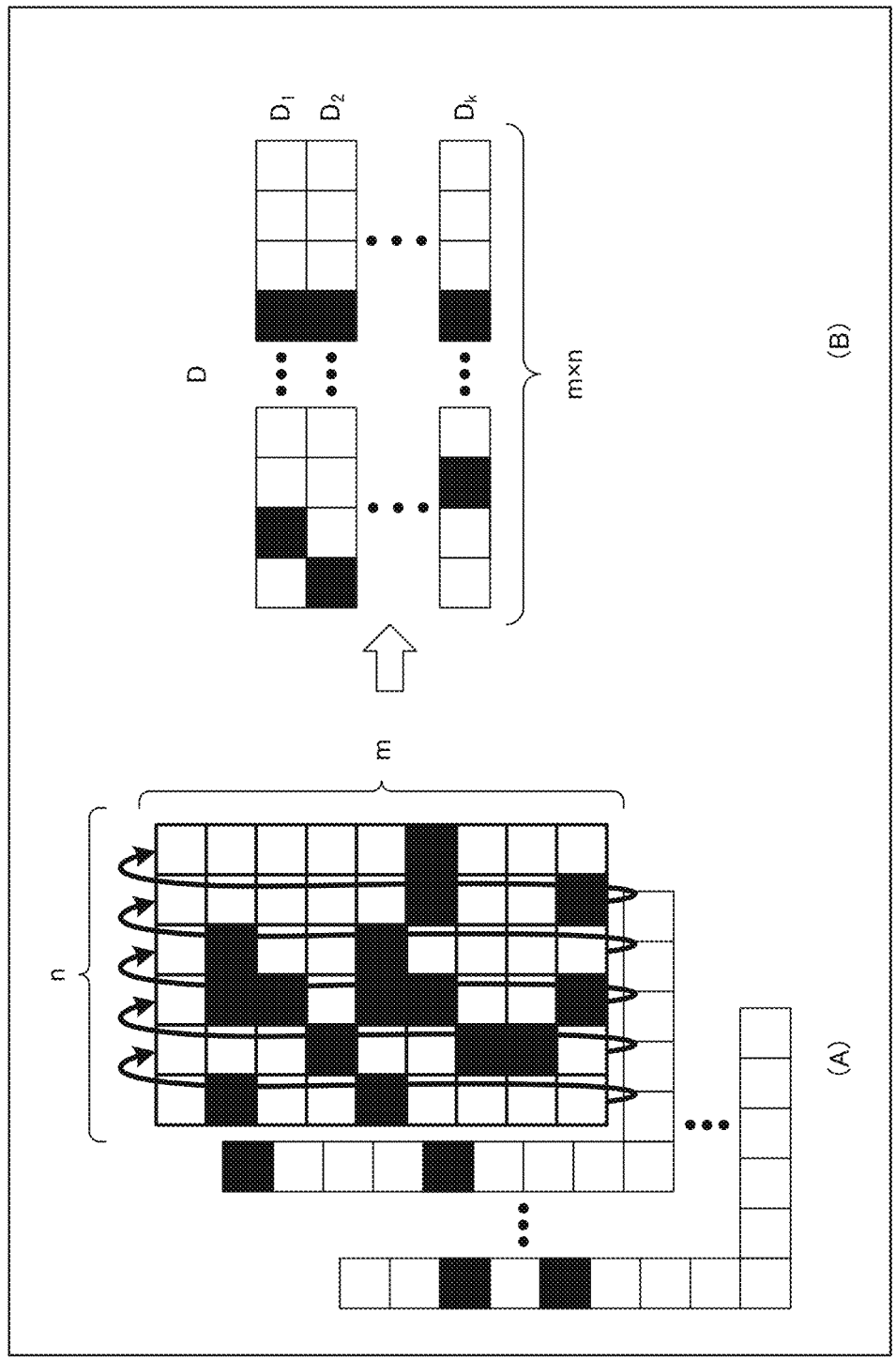
FIG. 4 is a diagram illustrating a relationship between a pattern of a filter and a transformation matrix.

The procedure for obtaining the transformation matrix D using the configuration illustrated in FIG. 3 will be further described with reference to FIG. 4. (A) of FIG. 4 schematically illustrates an example of the pattern of the filter 110. In the example illustrated in (A) of FIG. 4, in the pattern of the filter 110, in unit of pixels, the region through which the signal does not pass and is blocked is indicated by a black square, and a region through which the signal passes, as it is, is indicated by a white square.

In this case, first, the signal generator 14 generates a signal, and the two-dimensional signal detector 15 detects the signal that has passed through the filter 110. A magnitude of the power of the signal detected by the two-dimensional signal detector 15 varies for each pixel depending on the distribution of the portion of the filter 110 that blocks at least a part of the two-dimensional signal.

In the example illustrated in (A) of FIG. 4, the power of the signal for each pixel detected by the two-dimensional signal detector 15 is relatively large, regarding the pixel in the region of the filter 110 through which the two-dimensional signal passes. Similarly, the power of the signal for each pixel detected by the two-dimensional signal detector 15 is relatively small, regarding the pixel in the portion of the filter 110 that blocks at least a part of the two-dimensional signal. Then, the power of the signal for each pixel detected by the two-dimensional signal detector 15 is represented as an m×n dimensional vector as indicated by $D_1$ in (B) of FIG. 4, when arranged as indicated by an arrow in (A) of FIG. 4.

In the example illustrated in (B) of FIG. 4, the power of the signal is represented as a binary vector of m×n dimension. An element of a vector related to a pixel in which a power having a large value is detected is indicated by a white square, and an element of a vector related to a pixel in which a power having a small value is detected is indicated by a black square.

Such detection of the power for each pixel is repeatedly performed for each case where the positional relationship between the pixel of the two-dimensional signal detector 15 and the pattern of the filter 110 is different. The positional relationship between the pixel of the two-dimensional signal detector 15 and the pattern of the filter 110 may be changed by, for example, changing a positional relationship between the pixel of the two-dimensional signal detector 15 and a specific pattern of the filter 110. The positional relationship between the pixel of the two-dimensional signal detector 15 and the pattern of the filter 110 may be changed by using a filter 110 having a different distribution of the portion that blocks at least a part of the two-dimensional signal.

The positional relationship between the pixel of the two-dimensional signal detector 15 and the specific pattern of the filter 110 is changed by, for example, rotating the filter 110 around the direction in which the signal passes through. The positional relationship between the pixel of the two-dimensional signal detector 15 and the specific pattern of the filter 110 may be changed by moving the filter 110 in a direction intersecting with the direction in which the signal passes through.

When the positional relationship between the pixel of the two-dimensional signal detector 15 and the pattern of the filter 110 is changed, a positional relationship between the signal generator 14, the filter 110, and the two-dimensional signal detector 15 (distance in signal traveling direction in FIG. 3 or the like) is not changed.

(A) of FIG. 4 schematically illustrates an example of a case where the positional relationship between the pixel of the two-dimensional signal detector 15 and the pattern of the filter 110 is changed. Then, in the detection of the power that is repeatedly performed by changing the positional relationship between the pixel of the two-dimensional signal detector 15 and the pattern of the filter 110, a plurality of vectors is obtained from the power of the signal for each pixel detected by the two-dimensional signal detector 15. That is, the transformation matrix D includes k vectors $D_1$ to $D_k$ obtained by observing power k times by changing the positional relationship between the pixel of the two-dimensional signal detector 15 and the pattern of the filter 110. That is, each row of the transformation matrix D is a vector $D_i$ (1≤i≤k) obtained with respect to a specific positional relationship between a certain pattern of the filter 110 and the pixel of the two-dimensional signal detector 15.

Next, the procedure for reconstructing an image on the basis of the ADMM algorithm will be described. In this case, the transformation matrix D obtained by the procedure described above is used. In the following procedure, it is assumed that the image x to be reconstructed be an image of which a width includes m pixels and a length includes n pixels, as described above.

In the imaging apparatus 100, a plurality of powers of the two-dimensional signal that has passed through the pattern of the filter 110 and has detected by the detector 120 is used. Each of the plurality of powers of the two-dimensional signal is a power detected by the detector 120 by changing the positional relationship between the two-dimensional signal and the distribution of the portion of the filter 110 that blocks at least a part of the two-dimensional signal.

When the imaging apparatus 100 reconstructs an image, as setting the state of the filter 110 to be similar to that in a case where the transformation matrix D is obtained, the power of the two-dimensional signal is observed k times. In other words, in a case where the detector 120 detects the power of the two-dimensional signal, the filter 110 having the same pattern as that in a case where the transformation matrix D is obtained is used. In each of the k times of the observation of the power of the two-dimensional signal, the positional relationship between the filter 110 and the two-dimensional signal is assumed to be the same as a positional relationship between the filter 110 and the pixel related to the two-dimensional signal of the two-dimensional signal detector 15.

Figure 5A:
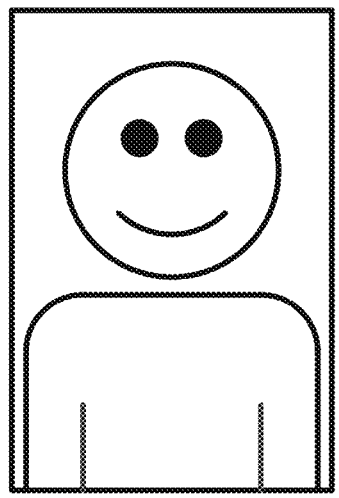
FIG. 5A is a diagram illustrating an image to be reconstructed.
Figure 5B:
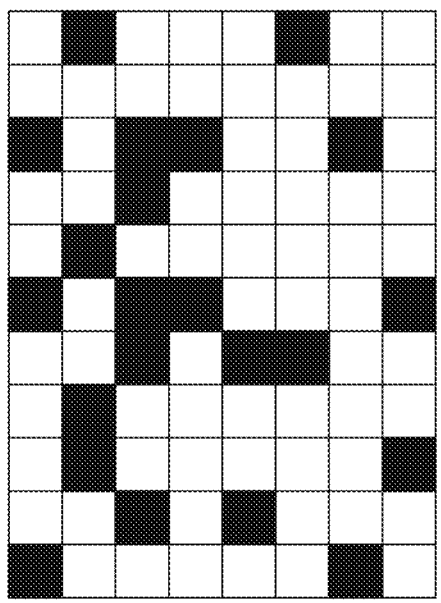
FIG. 5B is a diagram illustrating an example of a pattern of the filter used when a power is observed.
Figure 5C:
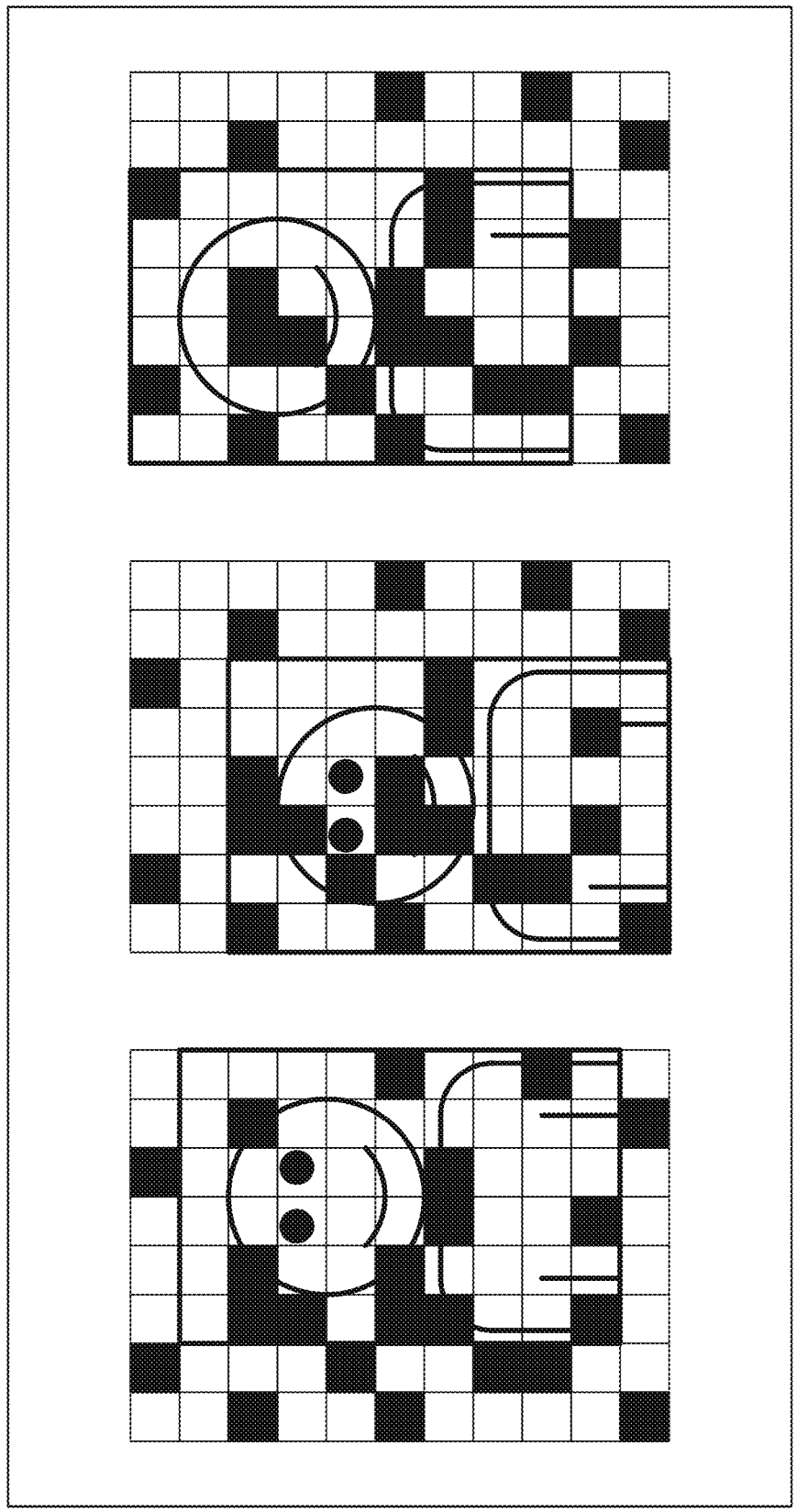
FIG. 5C is a diagram illustrating an example in which a positional relationship between a two-dimensional signal illustrated in FIG. 5A and the pattern of the filter has been changed.

An example in which power is observed k times will be described with reference to FIGS. 5A, 5B, and 5C. FIG. 5A illustrates an example of the image to be reconstructed. A light beam representing the image is converged by the lens 11. FIG. 5B illustrates an example of a pattern of the filter 110 used when the power is observed. FIG. 5C illustrates an example in which a positional relationship between a two-dimensional signal illustrated in FIG. 5A and the pattern of the filter 110 has been changed. That is, in a case where the image representing the image illustrated in FIG. 5A is reconstructed using the filter 110 illustrated in FIG. 5B, for example, as illustrated in FIG. 5C, the power is observed by changing the positional relationship between the two-dimensional signal and the pattern of the filter 110.

In the present example embodiment, the detector 120 is a detector that does not detect position information such as a power distribution or the like of the two-dimensional signal and detects only the power of the signal. Therefore, the power of the two-dimensional signal detected by the detector 120 is a sum of signal intensities of all the pixels in the image to be reconstructed in a case where the signal passes through the filter 110.

In this case, regarding the image x to be reconstructed by the imaging apparatus 100, a power $j_i$ of the signal detected by the detector 120 with respect to a pattern related to the vector $D_i$ included in any one of rows of the transformation matrix D is represented by a relationship as indicated in the following equation (1).

[Math. 1]

$$j_i = \sum_{k=1}^{m*n} d_k^i * x_k \quad (1)$$

In equation (1), the reference $d_k^i$ represents m×n elements included in the vector $D_i$ described above, and the reference $x_k$ represents a value in which values indicating intensities of the respective m×n pixels included in the image x are aligned and arranged in order. The references $d_k^i$ and $x_k$ indicate values at the associated position in the image.

A case is assumed where the detection of the power of the signal is performed by the detector 120 on the pattern related to each of vectors $D_1$ to $D_k$ related to any one of the rows of the transformation matrix D. In this case, regarding a vector J for the power $j_i$ of k signals detected for the respective vectors $D_1$ to $D_k$, a relationship of the following equation (2) is obtained.

[Math. 2]

$$D_{k \times mn} x_{mn \times 1} = J_{k \times 1} \quad (2)$$

In equation (2), for each of D, x, and J, a subscript indicates the number of elements in the matrix representing each of D, x, and J. The reference $D_{k \times mn}$ indicates a transformation matrix of k rows×(m×n) columns. That is, the transformation matrix $D_{k \times mn}$ includes k vectors $D_i$ (i=1 to k) each including (m×n) elements. The reference $x_{mn \times 1}$ indicates a vector of (m×n) rows. The reference $J_{k \times 1}$ indicates a vector of k rows. In the following description, each of D, x, and J without subscripts indicates the same content as described above.

In the compression sensing, a solution of a minimization problem indicated in the following equation (3) is obtained to reconstruct the image. That is, by obtaining the L1 norm solution in equation (3), the image x is reconstructed from the power detection results of the k signals described above.

[Math. 3]

$$\min \|x\|_1 \ \text{s.t.} \ J = Dx \quad (3)$$

In equation (3), $\|x\|_1$ represents the L1 norm of x.

The above solution is obtained using the ADMM algorithm. First, a cost function indicated by the following equation (4) is considered.

[Math. 4]

$$L(x) = \|x\|_1 + v^T (J - Dx) \quad (4)$$

Equation (4) is a cost function of the method of Lagrange multiplier. In equation (4), the reference v indicates a Lagrange multiplier.

In equation (3), a new variable z is introduced to distinguish x for the L1 norm from other x. The problem for minimizing L(x) indicated in equation (4) is replaced with a conditional minimization problem indicated in the following equation (5). In equation (5), the reference λ indicates a cost coefficient of the method of Lagrange multiplier.

[Math. 5]

$$\min_{x,z} \left\{ \|z\|_1 + \frac{1}{2\lambda} \|J - Dx\|_2^2 \right\} \ \text{s.t.} \ z - J = 0 \quad (5)$$

Then, a new cost function indicated in the following equation (6) is minimized along the procedure of the augmented Lagrange method.

[Math. 6]

$$L_{avg.}(x, z; u[t]) = \|z\|_1 + v^T (J - Dx) + \frac{\mu}{2} \|x - z + u[t]\|_2^2 \quad (6)$$

In equation (6), u [t] indicates an auxiliary term which converges a solution to an optimum solution when the constrained optimization problem is solved by a gradient method for performing iterative calculation from an appropriate initial point. When equation (6) is differentiated with respect to x, the following equation (7) is obtained.

[Math. 7]

$$\nabla_x L_{aug.}(x, z; u[t]) = -Dv^T + \mu(x - Z + u[t]) \quad (7)$$

As x that makes equation (7) be zero, the following equation (8) is obtained.

[Math. 8]

$$x = \frac{1}{\mu} D v^T + (z - u[t])  \quad (8)$$

When x obtained as in equation (8) is substituted into the original equation (6), equation (6) is in a form of the following equation (9).

[Math. 9]

$$L_{avg.}(x, z; u[t]) = \|z\|_1 + v^T \left( J - D \left( \frac{1}{\mu} D v^T + z - u[t] \right) \right) + \frac{1}{2\mu} \|D v^T\|_2^2 \quad (9)$$

Equation (9) can be considered as a quadratic function with respect to v. Therefore, the optimum solution that minimizes equation (9) is expressed by the following equation (10).

[Math. 10]

$$v = \mu (DD^T)^{-1} [J + D(z - u)] \quad (10)$$

By substituting the obtained equation (10) into equation (8), the following equation (11) is obtained.

[Math. 11]

$$x = D^T (DD^T)^{-1} J + (I + D^T (DD^T)^{-1} D)(z - u[t]) \quad (11)$$

Equation (11) is obtained by the gradient method for performing the iterative calculation described above. When the gradient method is applied to equation (11), the following equation indicated as equation (12) is obtained as an equation indicating a value obtained by t+1th iterative calculation for each of x, z, and u.

[Math. 12]

$$x[t+1] = D^T (DD^T)^{-1} J + \left( I + D^T (DD^T)^{-1} D \right)(z[t] - u[t])  \quad (12)$$
$$z[t+1] = W_{1/\mu}(x[t+1] + u[t])$$
$$u[t+1] = u[t] + (x[t+1] - z[t+1]) \text{ where}$$
$$W_{1/\mu}(x) = \begin{cases} x - 1/\mu & (x > 1/\mu) \\ 0 & (-1/\mu \le x \le 1/\mu) \\ x + 1/\mu & (x < -1/\mu) \end{cases}$$

In the present example embodiment, a case is assumed where the iterative calculation is performed only once. In this case, it is not necessary to consider z[t+1] and u[t+1]. Although it is necessary to initialize z[t] and u[t], z[0] and u[0] may be zero. Therefore, as the image x to be reconstructed, the following equation (13) is obtained.

[Math. 13]

$$x[1] = D^T (DD^T)^{-1} J \quad (13)$$

On the other hand, the ADMM algorithm exerts a great effect in a case where a basis that is expected to be sparse is found through a transformation. The sparse of the signal means a property that many components of the signal are zero. Therefore, in the reconstruction of the image x, it is necessary to convert x into a space having a sparse property in general. That is, the image is reconstructed in the space having the sparse property.

The sparsification is achieved, for example, by performing a discrete Fourier transformation or a wavelet transformation on the image x. Therefore, as indicated in the following equation (14), the sparsification of the image x is achieved using a sparse transformation matrix $\Phi$. The sparse transformation matrix $\Phi$ is, for example, one of a discrete Fourier transformation matrix or a wavelet transformation matrix. Then, Q is obtained by the ADMM algorithm described above.

[Math. 14]

$$\Phi \cdot x_{mn \times 1} = Q_{mn \times 1} \quad (14)$$

Equation (14) is converted into the form of the following equation (15) using an inverse matrix $\Phi^{-1}$ of the sparse transformation matrix $\Phi$.

[Math. 15]

$$\Phi^{-1} \cdot Q_{mn \times 1} = x_{mn \times 1} \quad (15)$$

Equation (15) is further converted into the form of the following equation (16) using the relationship indicated in equation (2).

[Math. 16]

$$D'_{k \times mn} \cdot \Phi^{-1} \cdot Q_{mn \times 1} = J_{k \times 1} \quad (16)$$

In a case where the sparse transformation matrix $\Phi$ is the discrete Fourier transformation matrix or the wavelet transformation matrix, a conjugate transpose matrix of $\Phi$ is represented by a subscript +. At the time of $\Phi^+$, the matrices $\Phi$ and $\Phi^+$ are inverse to each other.

Therefore, the following equation (17) is obtained from equation (16).

[Math. 17]

$$D'_{mn \times 1} \cdot \Phi^+ \cdot Q_{mn \times 1} = J_{k \times 1} \quad (17)$$

In equation (17), an unknown is Q. Therefore, by obtaining the minimum solution of the L1 norm as indicated in the following equation (18), an approximation solution Q″ of the unknown Q is obtained.

[Math. 18]

$$Q''_{mn \times 1} = \arg\min \|Q_{mn \times 1}\|_1 \, s.t. \, D'_{k \times mn} \cdot \Phi^+ \cdot Q_{mn \times 1} = J_{k \times 1} \quad (18)$$

Regarding equation (18), similar to the example in which equation (16) is obtained with respect to equation (3), the following equation (19) is obtained.

[Math. 19]

$$Q''_{mn \times 1}[1] = (D'_{k \times mn} \cdot \Phi^+)^+ \cdot \text{inv}[(D'_{k \times mn} \cdot \Phi^+) \cdot (D'_{k \times mn} \cdot \Phi^+)^+] \cdot J_{k \times 1} = P \cdot J_{k \times 1} \quad (19)$$

In equation (19), the reference P represents $(D'_{k \times mn} \cdot \Phi^+)^+ \cdot \text{inv}[(D'_{k \times mn} \cdot \Phi^+) \cdot (D'_{k \times mn} \cdot \Phi^+)^+]$.

That is, by obtaining the approximation solution Q″ of the unknown Q and using the obtained approximation solution Q″ and $\Phi^+$ described above, the image x to be reconstructed is obtained.

The k number of times of observation by the two-dimensional signal detector 15 or the detector 120 may be the number of times less than m×n which is the number of pixels in the image x to be reconstructed in general. For example, in a case where the sparsification is appropriately achieved, the number of times of observation by the two-dimensional signal detector 15 or the detector 120 may be about several % (percent) of the number of pixels. That is, the imaging apparatus 100 can reconstruct an image from a small amount of observation data obtained by changing the positional relationship between the two-dimensional signal and the pattern of the filter 110 by using the ADMM algorithm which is one method of the compression sensing.

The k number of times of observation by the two-dimensional signal detector 15 or the detector 120 is not limited to the example and is appropriately determined according to the image quality or the degree of the sparsification required for the image to be reconstructed.

Next, each element of the imaging apparatus 100 according to the present example embodiment will be described in detail.

The lens 11 forms the image to be reconstructed by the imaging apparatus 100. The lens 11 is disposed to form an image on the filter 110.

In a case where the two-dimensional signal is a visible light beam, the lens 11 is, for example, a general optical lens. Note that, in FIG. 2, the lens 11 is illustrated as a single lens. However, the lens 11 is not limited to this. The lens 11 may include a plurality of lenses. A specific configuration of the lens 11 is appropriately determined in accordance with conditions such as the configuration of the filter 110, the configuration or the type of the detector 120, or the like.

In a case where the two-dimensional signal is an electromagnetic wave or sound wave other than the visible light beam, an appropriate configuration that converges the two-dimensional signal is used as the lens 11 depending on the type of the signal. For example, a reflection mirror may be used as the lens 11.

The iris 12 and the scattering medium 13 are provided as needed in order to reconstruct the image by the imaging apparatus 100 with higher accuracy as described above.

The iris 12 blocks the miscellaneous signal included in the signals collected by the lens. As an example, in a case where the two-dimensional signal is the visible light beam, a diaphragm mechanism of a general optical lens is used as the iris 12.

The scattering medium 13 disperses an off-focus signal that is not converged by the lens 11 among the signals traveling toward the detector 120. By providing the scattering medium 13, the two-dimensional signal converged by the lens 11 is uniformed in the direction toward the detector 120. As the scattering medium 13, for example, opaque glass, a lump of fine particles such as alumina, or the like is used depending on the type of the two-dimensional signal.

As illustrated in FIG. 2, it is preferable that the scattering medium 13 be brought into close contact with a surface on which the detector 120 detects a signal. With such a configuration, a loss of the power caused by the reflection of the two-dimensional signal from the detection surface of the detector 120 is reduced.

By providing the iris 12 and the scattering medium 13, it is possible to remove noise included in the signal detected by the detector 120 and reduce the loss of the power of the two-dimensional signal detected by the detector 120. This improves the accuracy for detecting the power of the two-dimensional signal detected by the detector 120. Then, it is possible to reconstruct the image with higher image quality.

Note that each of the iris 12 and the scattering medium 13 is provided as needed. It is not needed to provide one or both of the iris 12 and the scattering medium 13 according to conditions such as the type of the two-dimensional signal to be detected, a relationship with other components, image quality required for the image to be reconstructed, or the like.

The filter 110 has a region through which the two-dimensional signal passes. Then, in the region of the filter 110, a portion that blocks at least a part of the two-dimensional signal (that is, portion having transmittance of two-dimensional signal different from that of the other portion) is provided. In the imaging apparatus 100, the filter 110 is disposed at a position where the image is formed by the lens 11.

In the present example embodiment, distribution of the portion of the filter 110 that blocks at least a part of the two-dimensional signal is not particularly limited. That is, in the filter 110, a portion having an optional transmittance is provided at an optional position. The portion of the filter 110 that blocks at least a part of the two-dimensional signal may be provided in association with the pixel of the image to be reconstructed and may be provided regardless of the pixel.

The portion of the filter 110 that blocks at least a part of the two-dimensional signal and the distribution thereof will be further described.

In the region of the filter 110 through which the two-dimensional signal passes, the portion other than the portion that blocks at least a part of the two-dimensional signal does not block the two-dimensional signal and the two-dimensional signal passes through. That is, in the portion other than the portion that blocks at least a part of the two-dimensional signal, the two-dimensional signal passes through the filter 110 at a transmittance in accordance with a material of the filter 110.

The portion of the filter 110 that blocks at least a part of the two-dimensional signal includes a non-transmission portion or a semi-transmission portion. Regarding the non-transmission portion, a portion through which the two-dimensional signal does not pass and is blocked, or that has a low transmittance through which the two-dimensional signal substantially does not pass may be a non-transmission portion. Regarding the semi-transmission portion, a part of the two-dimensional signal is blocked, and a remainder passes through the semi-transmission portion. In the semi-transmission portion, the transmittance of the two-dimensional signal is not particularly limited. In a case where a plurality of semi-transmission portions is included as the portion of the filter 110 that blocks at least a part of the two-dimensional signal, the transmittance of the two-dimensional signal in each portion may be the same or different from each other. By providing the semi-transmission portion in such a way that the transmittance has more stages within a range according to a sensitivity resolution of the detector 120, it is possible to reconstruct an image with less noise.

The distribution of the portion of the filter 110 that blocks at least a part of the two-dimensional signal may have a periodicity, may be a pseudo-random distribution, or a random distribution with no periodicity.

In a case where the distribution of the portion of the filter 110 that blocks at least a part of the two-dimensional signal has the periodicity, there is a case where noise according to the period appears in the reconstructed image. Therefore, a change in the transmittance of the pattern is most preferably a completely random change, and at least, is preferably a pseudo-random change that is expressed in a form other than superposition of simple analysis formulae. The superposition of the simple analysis formulae includes, for example, a sum or a product of trigonometric functions having several types of frequencies or linear addition thereof or the like. Because the change in the transmittance of the pattern is random or pseudo-random, it is possible to reconstruct the image with less noise in comparison with a case where the change in the transmittance has the periodicity.

In a case where the two-dimensional signal is a visible light beam, a material of which an amount of light transmitted can be adjusted such as glass is used for the filter 110. By forming a pattern that decreases the transmittance on the surface of the glass by a method that is appropriately selected, the pattern is provided. In a case where the two-dimensional signal is an electromagnetic wave other than the visible light beam, for example, a metal material or the like is used as the filter 110. In a case where the two-dimensional signal is a sound wave, for example, a material that changes an acoustic impedance such as a metal mask is used as the filter 110.

In the imaging apparatus 100, as described above, the image is reconstructed on the basis of the power detected by changing the positional relationship between the two-dimensional signal and the pattern of the filter 110. Then, the positional relationship between the two-dimensional signal and the pattern of the filter 110 is changed by changing the positional relationship between the specific pattern of the filter 110 and the two-dimensional signal. Therefore, the pattern control unit 111 controls the position of the filter 110 in such a way as to change the positional relationship between the two-dimensional signal and the pattern of the filter 110.

As described above, the positional relationship between the two-dimensional signal and the pattern of the filter 110 is changed by, for example, rotating the filter 110 around the direction in which the two-dimensional signal passes through. The positional relationship between the two-dimensional signal and the pattern of the filter 110 may be changed by moving the filter 110 in an optional in-plane direction on a plane of the filter that transmits the signal. For example, when it is assumed that the direction in which the signal passes through be an optical axis direction and the optical axis direction be the z direction, the positional relationship with the pattern is changed in an optional direction in the x-y plane. Therefore, the pattern control unit 111 performs control for changing the position of the filter 110 in such a way as to change the positional relationship between the two-dimensional signal and the pattern of the filter 110.

The positional relationship between the two-dimensional signal and the pattern of the filter 110 is controlled by the pattern control unit 111 similarly to the positional relationship between the pattern of the filter 110 and the pixel of the two-dimensional signal detector 15 in a case where the transformation matrix D is obtained.

Figure 6:
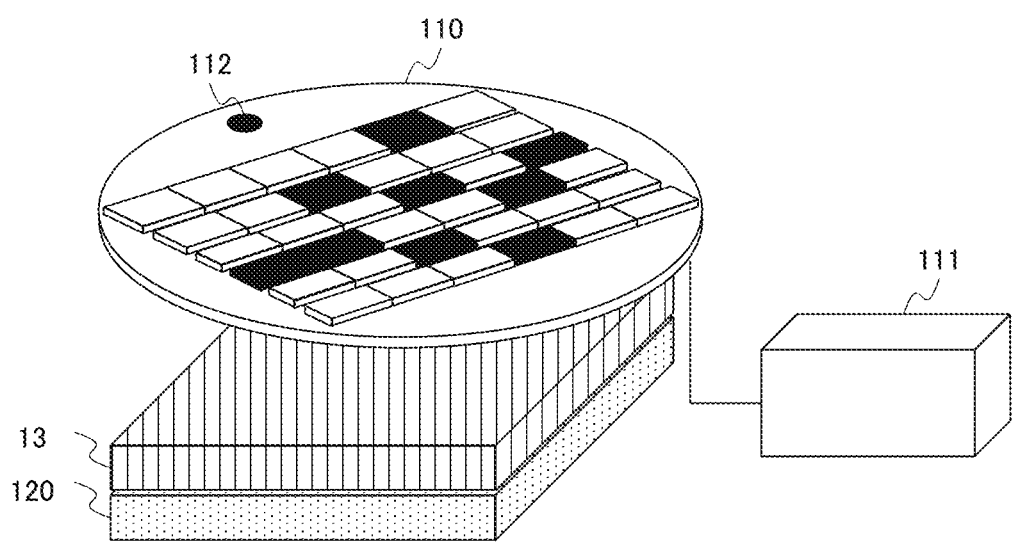
FIG. 6 is a diagram illustrating an example of a configuration in a case where the change in the positional relationship between the two-dimensional signal and the pattern of the filter is controlled by a pattern control unit.

FIG. 6 illustrates an example of a configuration in a case where the position of the filter 110 is controlled by the pattern control unit 111 in such a way as to change the positional relationship between the two-dimensional signal and the pattern of the filter 110. In the example illustrated in FIG. 6, the scattering medium 13 and the detector 120 are disposed to be opposed to one surface of the filter 110 through which the two-dimensional signal passes. That is, in the example illustrated in FIG. 6, it is assumed that the two-dimensional signal enter the filter 110 from an opposite side of the surface opposed to the scattering medium 13 of the filter 110 and form an image on the surface on which the pattern of the filter 110 is drawn.

In the example illustrated in FIG. 6, a rotation shaft 112 is provided in the filter 110. That is, the filter 110 is configured to be rotatable around the rotation shaft 112. Then, the pattern control unit 111 performs control in such a way that the positional relationship between the two-dimensional signal and the pattern of the filter 110 is changed by rotating the filter 110 at the position where the two-dimensional signal forms an image by the lens 11.

Note that the movement of the filter 110 is not limited to the example illustrated in FIG. 6. An example of a case where the positional relationship between the two-dimensional signal and the pattern of the filter 110 is changed by moving the filter 110 will be described with reference to FIGS. 7A, 7B, and 7C. In each of FIGS. 7A, 7B, and 7C, a black-and-white pattern is the pattern provided on the filter 110. In this case, it is assumed that a region of the filter 110 drawn in black be the non-transmission portion described above, and a region of the filter 110 drawn in white be a portion through which the two-dimensional signal passes as it is. In each of FIGS. 7A, 7B, and 7C, it is assumed that the face be the image to be reconstructed.

Figure 7B:
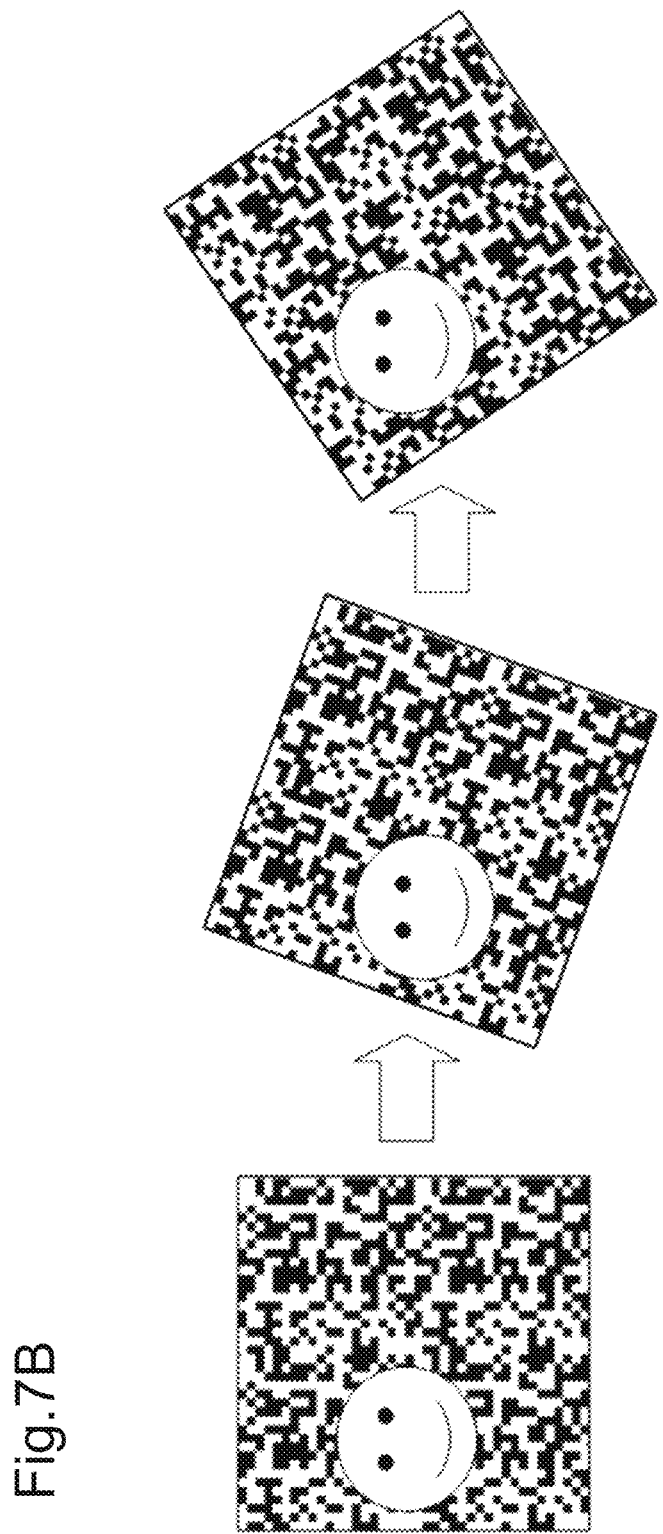
FIG. 7B is a diagram illustrating an example of a case where the positional relationship between the two-dimensional signal and the pattern of the filter changes.

In FIG. 7A, the pattern of the filter 110 rotates around the center portion of the face that is the image to be reconstructed as an axis. In FIG. 7B, the filter 110 is disposed in such a way that the face that is the image to be reconstructed is positioned at a position away from the center of the pattern. Then, the pattern of the filter 110 rotates around the center portion of the pattern. Moreover, in FIG. 7C, the filter 110 moves in a direction along the surface on which the pattern is provided while rotating.

Figure 7C:
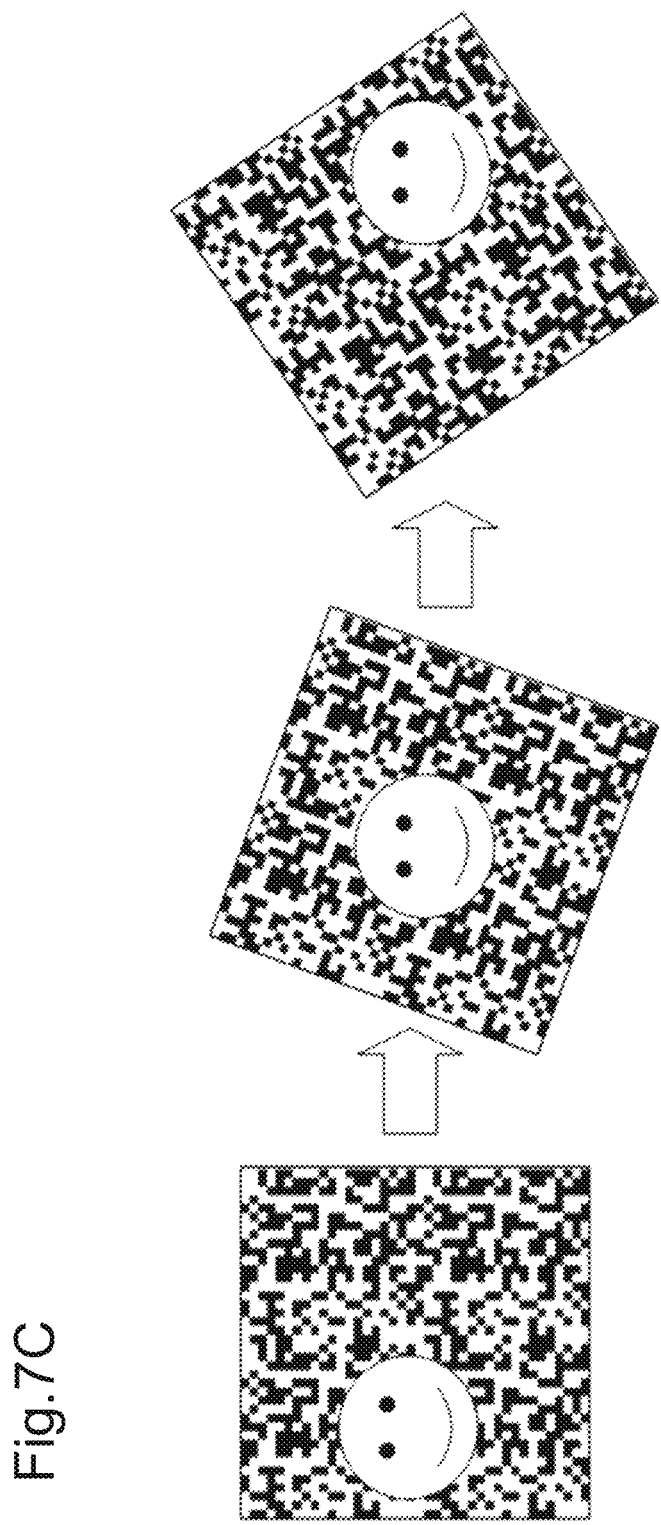
FIG. 7C is a diagram illustrating an example of a case where the positional relationship between the two-dimensional signal and the pattern of the filter changes.

The pattern control unit 111 may control the position of the filter 110 as illustrated in FIGS. 7A, 7B, and 7C, without being limited to the example illustrated in FIG. 6. The control of the position of the filter 110 by the pattern control unit 111 is not limited to these examples. Then, as indicated in these examples, by detecting the power of the two-dimensional signal by the detector 120 while the filter 110 is being rotated or moved, it is possible to detect the power of the plurality of two-dimensional signals required for the reconstruction of the image at high speed.

As the method for controlling the specific position of the pattern control unit 111 and the mechanism for changing the position of the filter 110, a known method and mechanism are appropriately used.

In a case where the change in the positional relationship between the two-dimensional signal and the pattern has the periodicity, there is a case where noise according to the periodicity appears in the image to be reconstructed. Therefore, it is preferable that the change in the positional relationship between the two-dimensional signal and the pattern be a random change with no periodicity or a change close to a random change similarly to the change in the transmittance of the pattern of the filter 110.

For example, in FIGS. 7A, 7B, and 7C, in a case illustrated in FIG. 7A, it is assumed that a circumferential noise be generated around the center portion of the face which is the center of the rotation of the pattern. In the example illustrated in FIG. 7B, it is assumed that a fan-shaped noise be generated around the center portion of the rotation of the pattern. On the other hand, in FIG. 7C, a noise according to the pattern moving direction is generated. However, it is assumed that the generated noise be smaller than that in the example in FIG. 7A or 7B or be an inconspicuous noise with small periodicity. Therefore, in the examples in FIGS. 7A, 7B, and 7C, in order to reduce or make inconspicuous the noise included in the image to be reconstructed, it is preferable to move the filter 110 as illustrated in the example illustrated in FIG. 7C.

The positional relationship between the two-dimensional signal and the pattern of the filter 110 may be changed by using the filter 110 having a different distribution of the portion that blocks at least a part of the two-dimensional signal as described above. For example, in a case where a mechanism that changes a portion having a different transmittance of the two-dimensional signal is provided in the filter 110, the distribution of the portion of the filter 110 that blocks at least a part of the two-dimensional signal in the region through which the two-dimensional signal passes may be changed by the mechanism. The positional relationship between the two-dimensional signal and the pattern of the filter 110 may be changed by using the plurality of filters 110.

The detector 120 detects the power of the two-dimensional signal that has passed through the filter 110 as described above. As the detector 120, a general detector that detects the power of the visible light and the electromagnetic waves having a specific wavelength or wavelength band is appropriately used depending on the wavelength of the two-dimensional signal and other conditions.

In the present example embodiment, the detector 120 detects the magnitude of the power of the signal. That is, it is not necessary for the detector 120 to detect position information such as the distribution of the position of the signal or the like. It is sufficient that the detector 120 be a single-pixel sensor, and the detector 120 does not need to be a sensor that detects the position information of the power of the two-dimensional signal as arrayed sensors. The imaging apparatus 100 can acquire a two-dimensional image without using sensors in an array that may be expensive depending on the wavelength band to be detected or the like.

As the detector 120, a general detector that can detect a power of a speckle pattern is appropriately used depending on the wavelength of the two-dimensional signal and other conditions. As the detector 120, a camera including a CCD camera or a CMOS image sensor, an ultraviolet camera, an InGaAs camera, a thermal image camera, or the like are appropriately used depending on the wavelength of the two-dimensional signal and other conditions.

A power gradation of the signal that can be detected by the detector 120 is not particularly limited. In a case where the sensitivity solution of the detector 120 is high and the power of the two-dimensional signal is detected in more gradations, the image with less noise can be reconstructed by using the filter 110 including the portion having the transmittance at more gradations according to the sensitivity solution.

The reconstruction unit 130 reconstructs the image using the transformation matrix D obtained in advance as described above, on the basis of the powers of the plurality of signals detected by the detector 120. Each of the plurality of signals detected by the detector 120 has a power detected in a case where the distribution of the two-dimensional signal is different from the distribution of the portion of the filter 110 that blocks at least a part of the two-dimensional signal.

More specifically, the reconstruction unit 130 obtains Q using the relationship in equation (18) described above, on the basis of the power of the signal obtained by the detection of k times by the detector 120. As described above, Q is a value obtained by performing the discrete Fourier transformation or the wavelet transformation on the image x. Then, when Q is obtained, the reconstruction unit 130 reconstructs an image using the inverse matrix $\Phi^{-1}$ of the sparse transformation matrix $\Phi$. In the present example embodiment, the image to be reconstructed in this case is assumed as a monochromatic image.

The reconstruction unit 130 is achieved, for example, by appropriately combining hardware including a Central Processing Unit (CPU) and a memory and software that reconstructs the image. A specific configuration of the reconstruction unit 130 is not particularly limited and may be achieved by a Field Programmable Gate Array (FPGA), dedicated hardware, or the like. The reconstruction unit 130 may have a function for obtaining the transformation matrix D by a procedure of the calibration process described with reference to FIG. 3.

Figure 8:
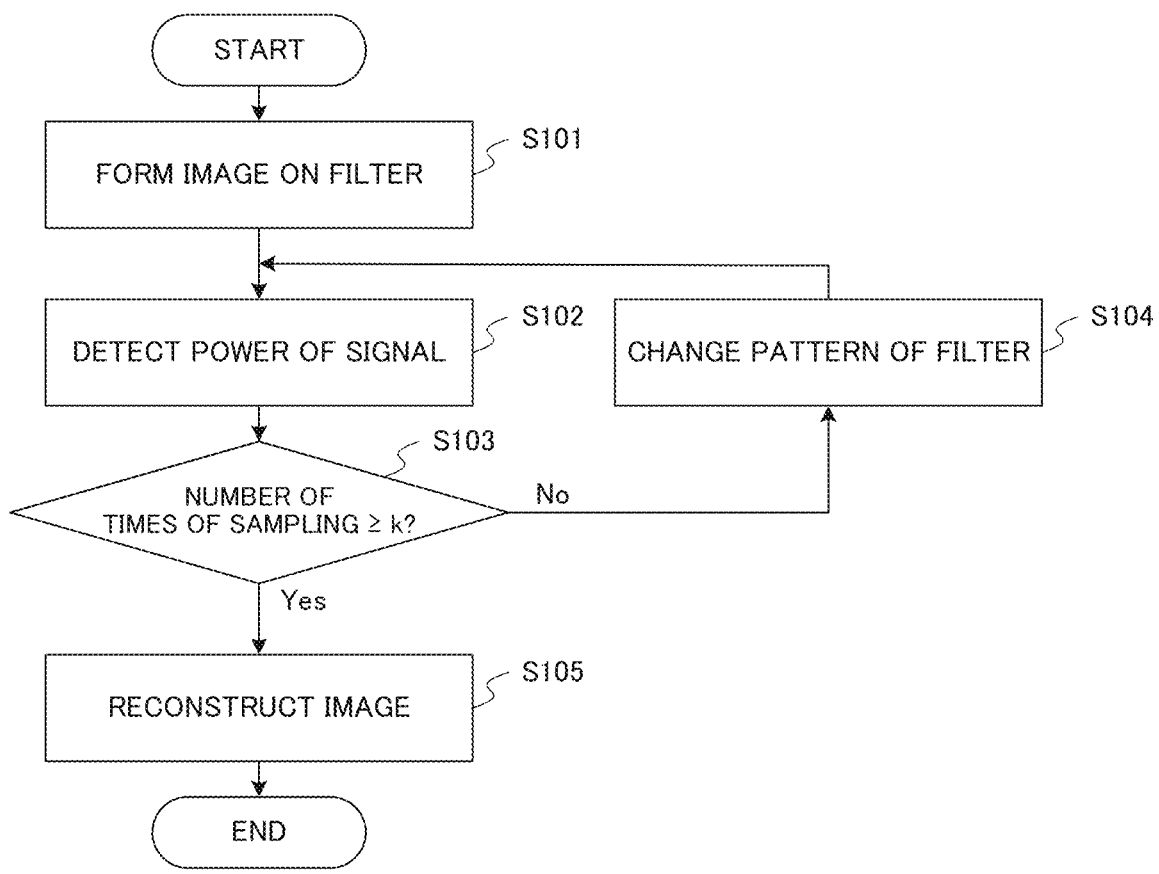
FIG. 8 is a flowchart illustrating an operation of the imaging apparatus according to the example embodiment.

Next, an example of an operation of the imaging apparatus 100 will be described with reference to the flowchart illustrated in FIG. 8. In the following description of the operation, it is assumed that the transformation matrix D be obtained in advance by the procedure of the calibration process described with reference to FIG. 3 with respect to the pattern of the filter 110.

First, the two-dimensional signal that has passed through the lens 11 and indicates an image forms an image in the region of the filter 110 through which the two-dimensional signal passes (step S101). That is, in the region of the filter 110 through which the two-dimensional signal passes, as described above, the portion that blocks at least a part of the two-dimensional signal is provided. That is, the two-dimensional signal forms an image of the pattern of the filter 110.

The detector 120 detects the power of the two-dimensional signal that forms the image of the pattern of the filter 110 and has passed through the filter (step S102).

Next, the reconstruction unit 130 determines whether the power is observed k times, which is the predetermined number of times of observation, in step S102 (step S103). In a case where the number of times of observation does not reach the predetermined number (step S103: No), the positional relationship between the two-dimensional signal and the pattern of the filter 110 is controlled to be changed (step S104), so that the positional relationship between the two-dimensional signal and the pattern of the filter 110 is changed. This control is performed by the pattern control unit 111, for example. In this case, the positional relationship between the two-dimensional signal and the pattern of the filter 110 is controlled to be the same as any one of the positional relationships between the pixel of the two-dimensional signal detector 15 and the pattern of the filter 110 in a case where the transformation matrix D is obtained. Then, returning to step S102, the detector 120 detects the power of the two-dimensional signal.

In a case where the number of times of observation has reached the predetermined number (step S103: Yes), the reconstruction unit 130 reconstructs an image on the basis of the plurality of powers detected in step S102 (step S105). That is, the reconstruction unit 130 reconstructs the image using the transformation matrix D that is obtained in advance on the basis of the power of the signal obtained by the k times of observation by the detector 120.

As described above, the imaging apparatus 100 according to the present example embodiment reconstructs the image on the basis of the power of the plurality of two-dimensional signals detected by changing the positional relationship between the two-dimensional signal indicating the image and the distribution of the portion of the filter 110 that blocks at least a part of the two-dimensional signal (in a case of different distributions). The number of times of observation of the power detected when the imaging apparatus 100 reconstructs the image is less than the number of pixels in the image to be reconstructed. The positional relationship between the two-dimensional signal and the distribution of the portion of the filter 110 that blocks at least a part of the two-dimensional signal can be easily changed, for example, by appropriately moving the filter 110. Therefore, the imaging apparatus 100 can increase an imaging processing speed.

It is sufficient that the detector 120 included in the imaging apparatus 100 be a detector that does not detect the position information and detects only the power of the signal. Therefore, for example, even in a case where it is difficult to array the detectors such as a far-infrared detector, due to various reasons including the cost, it is possible for the imaging apparatus 100 to easily acquire a two-dimensional image for the signal related to the wavelength band.

(Modification)

A modification of the imaging apparatus 100 described above is conceivable.

The imaging apparatus 100 has reconstructed a monochromatic image. However, the imaging apparatus 100 may be a so-called multicolor device, that is, a device that reconstructs an image for a plurality of wavelengths.

Figure 9:
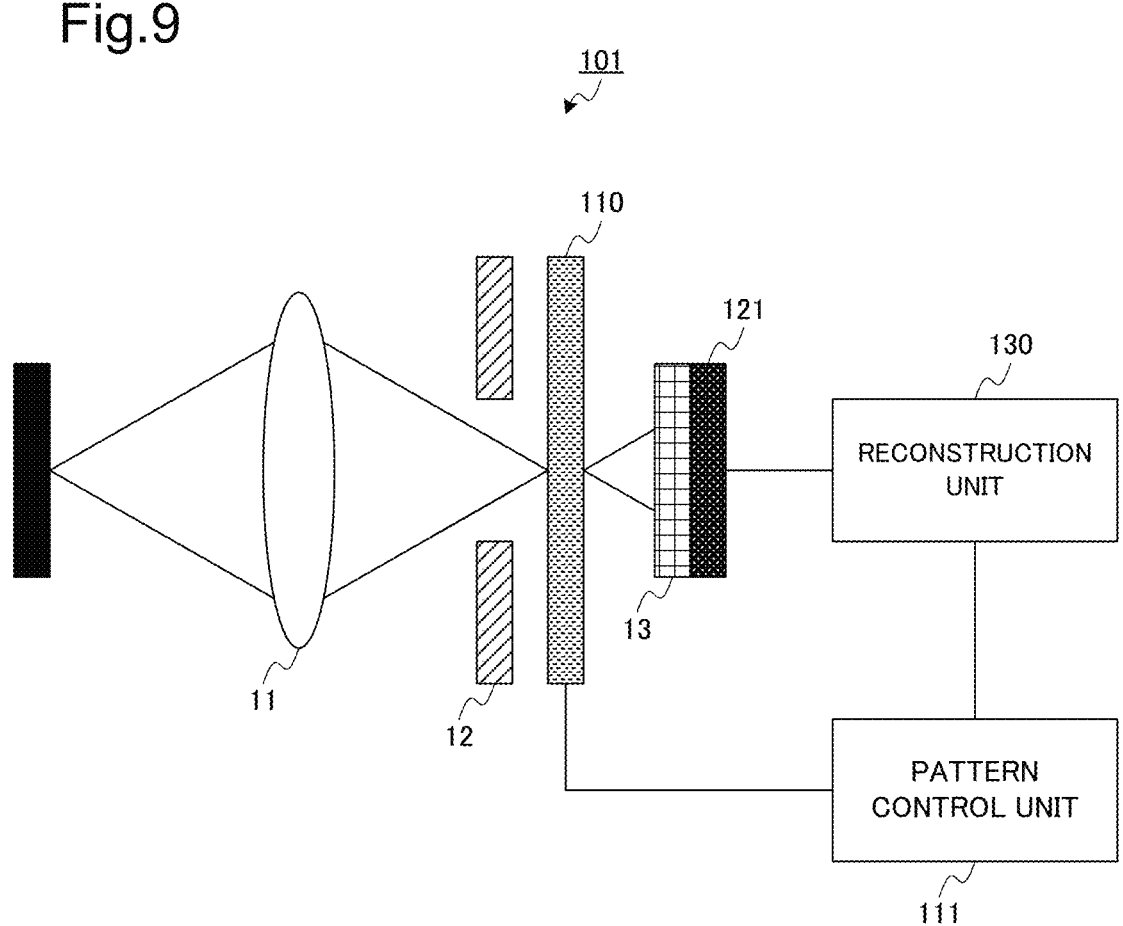
FIG. 9 is a diagram illustrating an example of an imaging apparatus according to a modification of the example embodiment.

FIG. 9 illustrates an example of a configuration in a case where an imaging apparatus reconstructs an image for a plurality of wavelengths. In the example illustrated in FIG. 9, an imaging apparatus 101 includes a detector 121 instead of the detector 120. The detector 121 is a sensor including a plurality of pixels. As the detector 121, for example, an array sensor in which pixels are arranged in a two-dimensional direction and a line sensor are used. However, the type of the detector 121 is not particularly limited.

Then, each pixel of the detector 121 has a filter that selectively transmits a specific wavelength provided therein in such a way that the respective pixels have configurations that detect different wavelengths or wavelength bands.

In the imaging apparatus 101, an element related to the wavelength of the detector 121 is selected according to a wavelength of an image to be reconstructed. Then, the image is reconstructed on the basis of a power of a plurality of two-dimensional signals detected by the selected element. By repeatedly reconstructing the image by changing the selected element, it is possible to reconstruct an image for a large number of wavelengths.

A transformation matrix D used when the image is reconstructed is different for each wavelength. Therefore, the transformation matrix D is obtained in advance for each wavelength. When the image is reconstructed, the transformation matrix D according to the wavelength is used. Then, by repeatedly reconstructing the image for different wavelengths, the image for a large number of wavelengths is reconstructed.

A device that reconstructs the image for the plurality of wavelengths is not limited to the imaging apparatus 101. For example, in a case where an image irradiated with light from a light source is reconstructed, it is possible to reconstruct an image for the plurality of wavelengths by providing a spectroscopic mechanism in the light source and reconstructing an image for each of the plurality of wavelengths by the imaging apparatus 100.

It is possible for the imaging apparatus 101 or the like to reconstruct the image for a large number of wavelengths. That is, the imaging apparatus 101 or the like can perform hyperspectral imaging.

(Simulation Example)

It has been confirmed through simulation that the imaging apparatus 100 described above reconstructs an image.

An image to be reconstructed was an image having 128 pixels in each of the vertical and horizontal directions. The pattern of the filter 110 and the position of the pattern were controlled as illustrated in FIG. 7C. Each time when the pattern was rotated by 0.2 degrees, signal sampling was performed.

Figure 10A:
FIG. 10A is a diagram illustrating an example of an original image in a simulation example.
Figure 10B:
FIG. 10B is a diagram illustrating an example of an image to be reconstructed in the simulation example.

Under these conditions, an original image and an image reconstructed in a case where sampling is performed on 10% (percent) of the number of pixels in the original image are respectively illustrated in FIGS. 10A and 10B. As illustrated in FIGS. 10A and 10B, when the original image and the reconstructed image are compared with each other, it can be confirmed that a part of an outline of a person, brightness and darkness of the image, and accessories of a hat were restored in the reconstructed image.

As described above, when it is assumed that sampling be performed each time when the pattern of the filter 110 rotates by 0.2 degrees, sampling of 1800 times can be performed each time when the pattern makes one rotation. If it is assumed that it be necessary to perform the sampling on 10% (percent) of the number of pixels when the image having 128×128 pixels is reconstructed, as described above, the sampling necessary for the reconstruction of the single image is performed each time when the pattern makes one rotation.

Therefore, when a case is assumed where the rotation speed of the pattern is 1800 rpm (times/minute), about 30 images can be reconstructed per second. That is, it can be confirmed that the imaging apparatus 100 can increase the speed of the imaging processing including the reconstruction of the image.

The example embodiment of the present disclosure is not limited to the example embodiment described above. The components of the example embodiment according to the present disclosure can be modified in various ways that will be understood by those skilled in the art. The components of the example embodiment can be combined with each other without departing from the scope of the present disclosure.

This application is based upon and claims the benefit of priority from Japanese Patent Application No. 2018-052222, filed on Mar. 20, 2018, the disclosure of which is incorporated herein in its entirety by reference.

REFERENCE SIGNS LIST 100 imaging apparatus
110 filter
111 pattern control unit
112 rotation shaft
120 detector
130 reconstruction unit
11 lens
12 iris
13 scattering medium
14 signal generator
15 two-dimensional signal detector

What is claimed is:

1. An imaging apparatus comprising:
    a filter that includes a two-dimensional spatial region through which a two-dimensional signal indicating an image passes, and includes a portion which blocks at least a part of the two-dimensional signal in the region;
    a detector that detects power of the two-dimensional signal passing through the filter;
    at least one memory storing a set of instructions; and
    at least one processor configured to execute the set of instructions to
    reconstruct the image indicated by the two-dimensional signal based on the power detected in a plurality of conditions that differ in positional relationship between the two-dimensional signal imaged on the filter and a distribution of the portion,
    wherein the at least one processor is further configured to execute the set of instructions to reconstruct the image based on an alternating direction method of multipliers (ADMM) algorithm using a transformation matrix obtained for each of the distribution of the portion and the positional relationship, the transformation matrix being different for each wavelength.

2. The imaging apparatus according to claim 1, wherein the at least one processor is configured to execute the set of instructions to
control a position of the filter in such a way as to change the positional relationship.

3. The imaging apparatus according to claim 2, wherein the at least one processor is configured to execute the set of instructions to
control the position of the filter in such a way as to change the positional relationship by rotating the filter at a position where the two-dimensional signal is imaged.

4. The imaging apparatus according to claim 2, wherein the at least one processor is configured to execute the set of instructions to
control the position of the filter in such a way as to change the positional relationship by moving the filter in a direction intersecting with a direction in which the two-dimensional signal passes through the filter at the position where the two-dimensional signal is imaged.

5. The imaging apparatus according to claim 1, wherein the filter includes a non-transmission portion that blocks the two-dimensional signal as the portion that blocks at least a part of the two-dimensional signal.

6. The imaging apparatus according to claim 1, wherein the filter includes a semi-transmission portion through which a part of the two-dimensional signal passes and that blocks a part of the two-dimensional signal as the portion that blocks at least a part of the two-dimensional signal.

7. The imaging apparatus according to claim 1, wherein the detector includes a plurality of pixels that detect the two-dimensional signal at different wavelengths, and
the at least one processor is configured to execute the set of instructions to
reconstruct the image at each of a plurality of wavelengths based on the power of the two-dimensional signal, the power being detected at the plurality of wavelengths.

8. An imaging method comprising:
detecting power of a two-dimensional signal passing through a filter that includes a two-dimensional spatial region through which the two-dimensional signal indicating an image passes, and includes a portion which blocks at least a part of the two-dimensional signal in the region; and
reconstructing the image indicated by the two-dimensional signal based on the power detected in a plurality of conditions that differ in positional relationship between the two-dimensional signal imaged on the filter and a distribution of the portion,
wherein the reconstructing the image is based on an alternating direction method of multipliers (ADMM) algorithm using a transformation matrix obtained for each of the distribution of the portion and the positional relationship, the transformation matrix being different for each wavelength.

* * * * *